June 16, 1942.　　M. P. WINTHER ET AL　　2,286,777
SPEED CONTROL UNIT
Filed May 4, 1940　　6 Sheets-Sheet 3

Martin P. Winther,
Anthony Winther,
Inventors.
Haynes and Koenig
Attorneys.

June 16, 1942.  M. P. WINTHER ET AL  2,286,777
SPEED CONTROL UNIT
Filed May 4, 1940  6 Sheets-Sheet 4
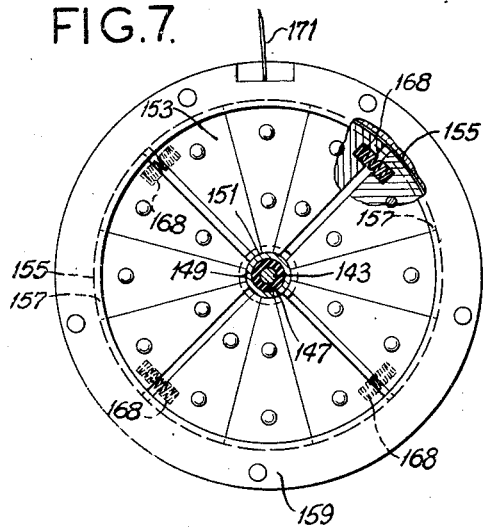
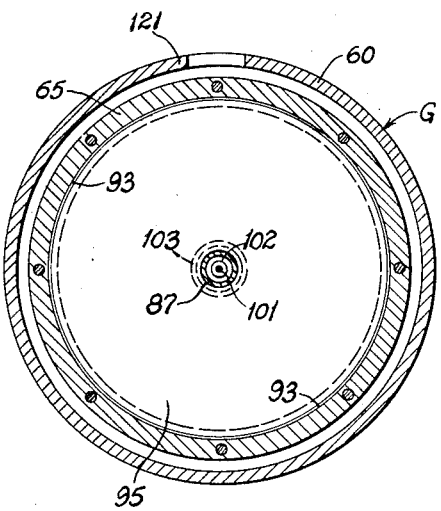
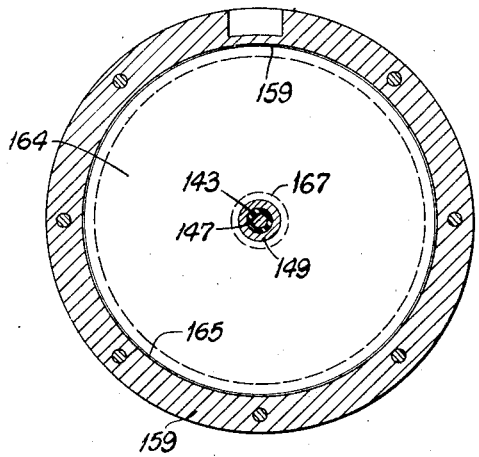
Martin P. Winther,
Anthony Winther,
Inventors.
Haynes and Koenig
Attorneys.

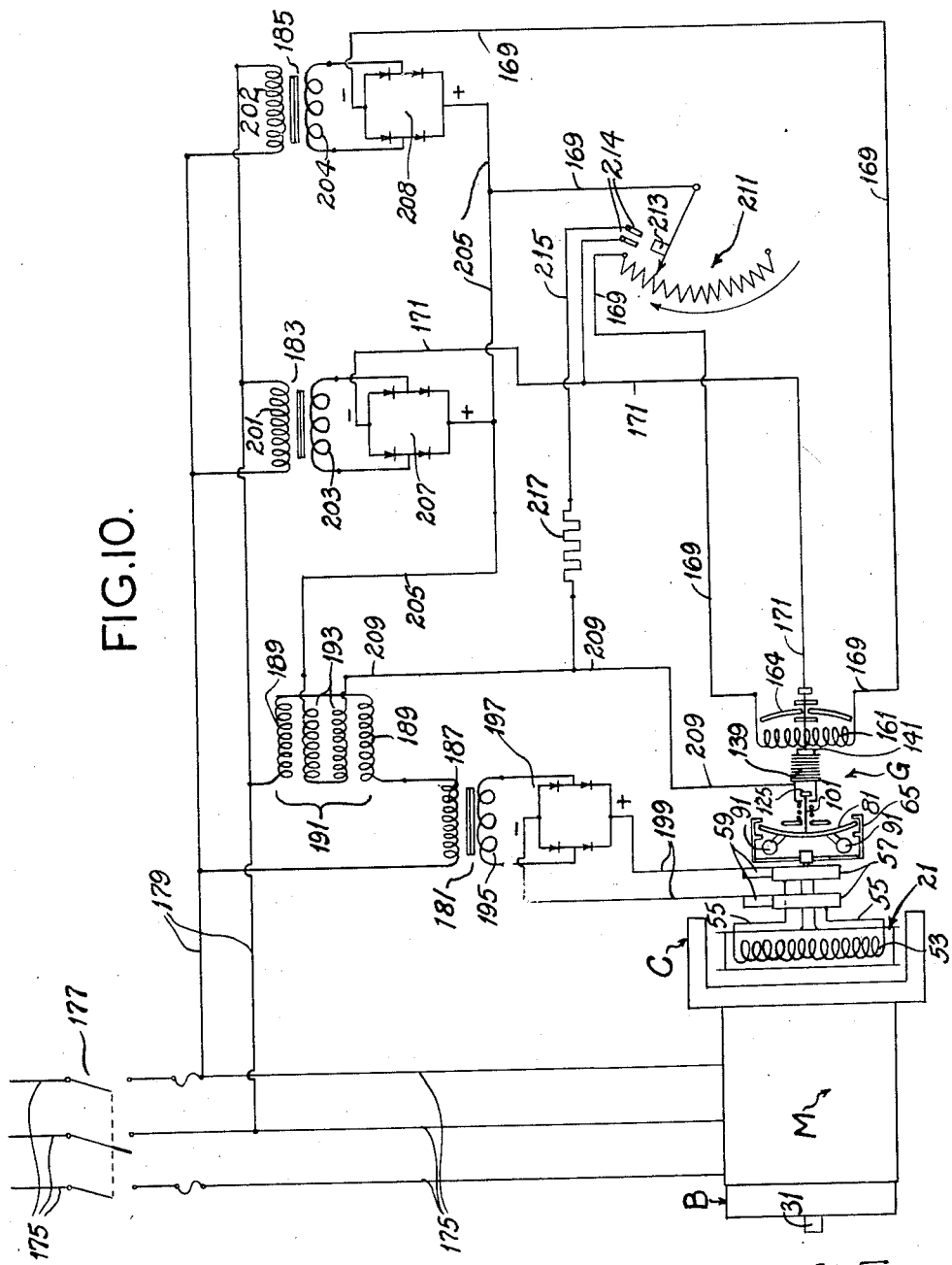

June 16, 1942.  M. P. WINTHER ET AL  2,286,777
SPEED CONTROL UNIT
Filed May 4, 1940   6 Sheets-Sheet 6

Martin P. Winther,
Anthony Winther,
Inventors.
Haynes and Koenig
Attorneys.

Patented June 16, 1942

2,286,777

UNITED STATES PATENT OFFICE 2,286,777

SPEED CONTROL UNIT

Martin P. Winther, Waukegan, Ill., and Anthony Winther, Kenosha, Wis., assignors to Martin P. Winther, as trustee Application May 4, 1940, Serial No. 333,314

7 Claims. (Cl. 172—239)

This invention relates to speed control units and with regard to certain more specific features, to an electric, variable speed reducer unit, useful for example with a constant-speed motor energized from an A. C. source.

Among the several objects of the invention may be noted the provision of a preferably (though not necessarily) constant-speed, electrical motor driving unit, including a self-contained controlled inductive coupling to a driven member for effecting speed reduction, wherewith an infinite number of speed ratios may be controllably obtained at the rated torque of the motor; the provision of a unit of this class adapted for rapidly intermittent starting and disconnection of a load with either gradual or quick acceleration, as desired; the provision of a unit of the class described in which widely different predetermined output speeds may be maintained within close limits of regulation; and the provision of a speed reducer which will absorb torsional impulses and vibrations. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a longitudinal section showing in a self-contained unit a motor M, an inductive coupling C, a governor G and an eddy-current brake B;

Fig. 7 is a vertical section taken on line 7—7 of Fig. 2 showing certain armature members;

Figure 2:
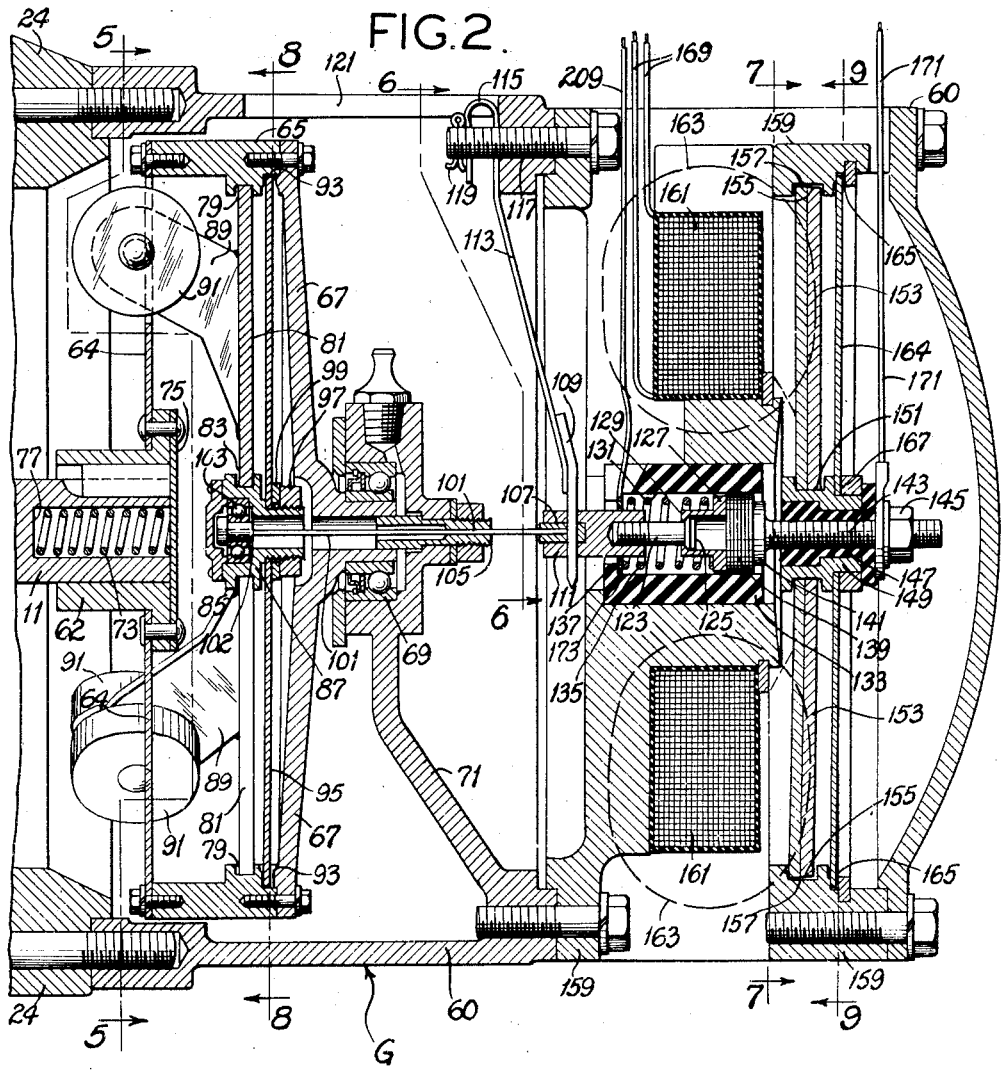
Fig. 2 is an enlarged longitudinal section of the governor portions at the right-hand end of Fig. 1.
Figure 11:
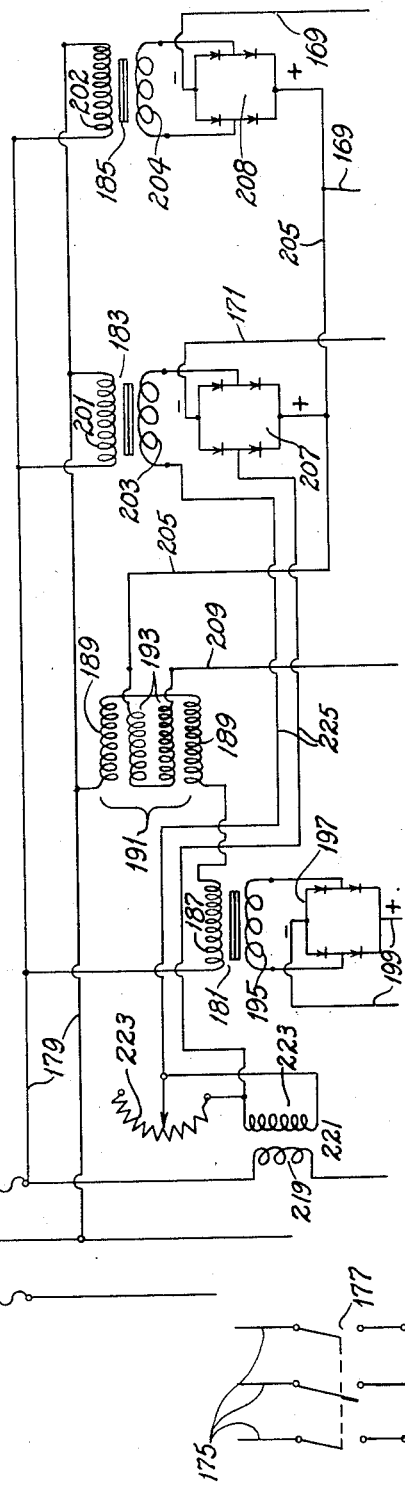
Figure 12:
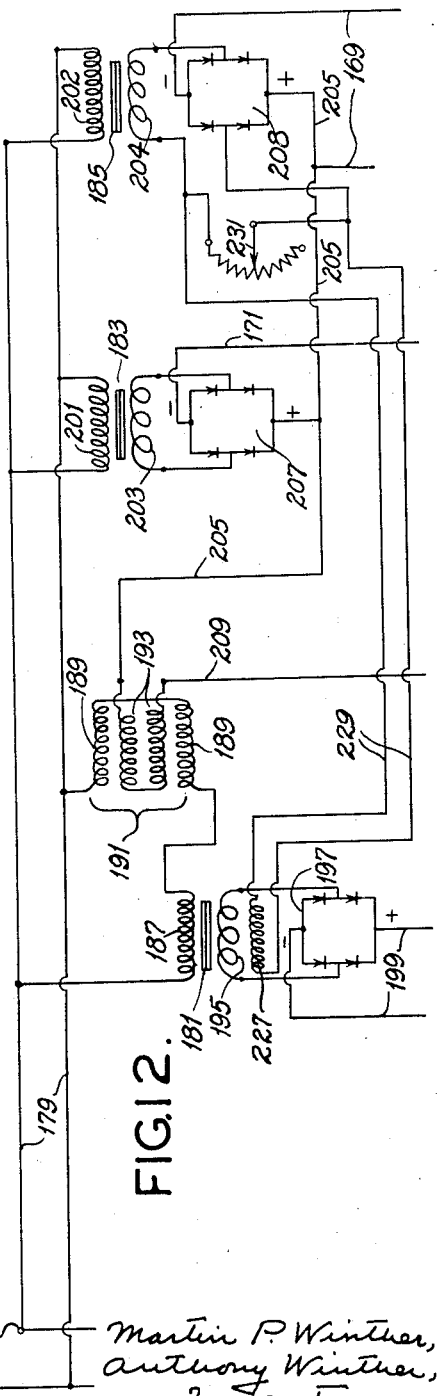

Figs. 8 and 9 are vertical sections on lines 8—8 and 9—9 respectively of Fig. 2 showing certain disc return springs;

Fig. 10 is a wiring diagram; and,

Figs. 11 and 12 are fragmentary wiring diagrams of certain alternatives.

Similar reference characters indicate corresponding parts throughout the several views of the drawing.

Figure 1:
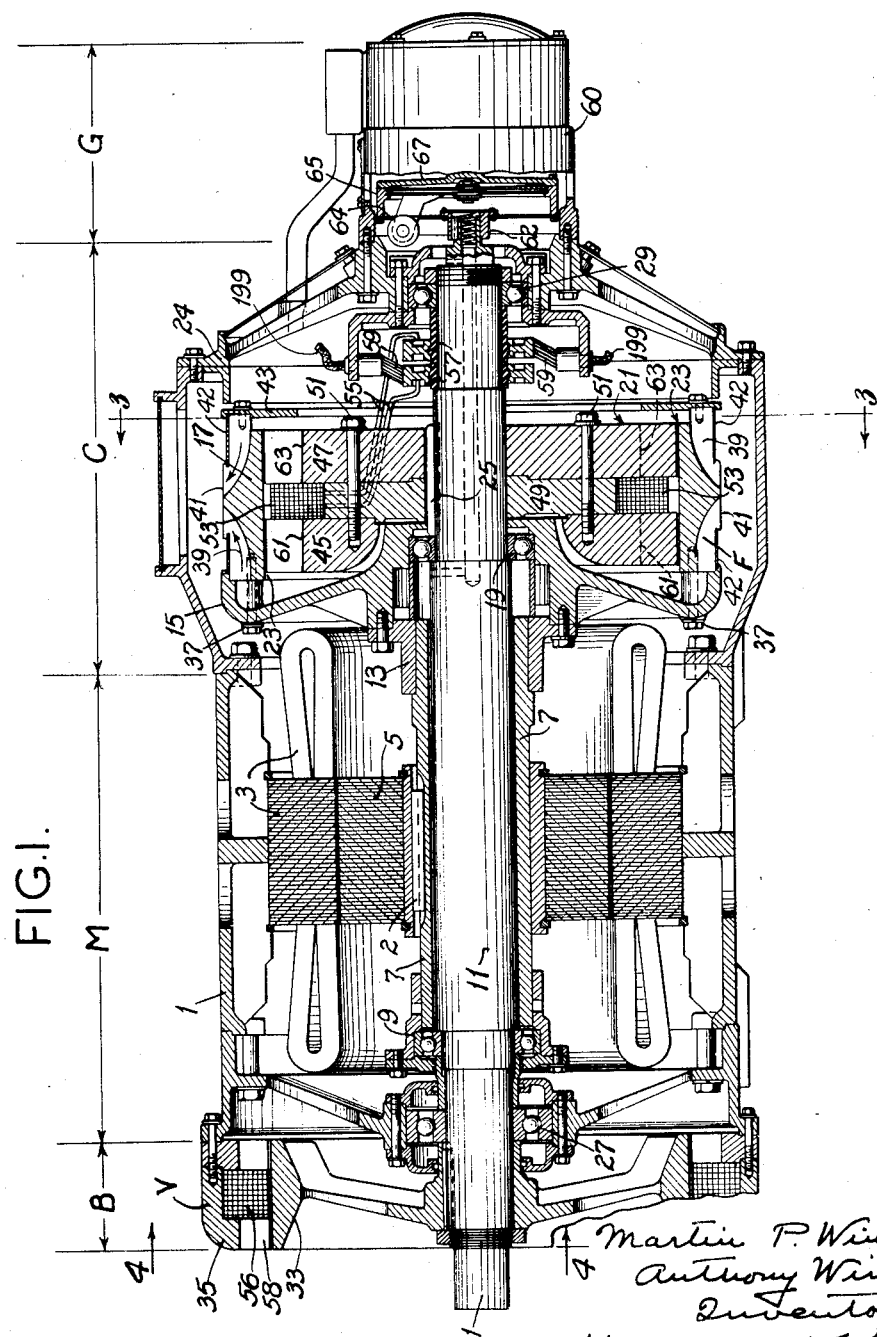

Referring now more particularly to Fig. 1, there is shown at numeral 1 a motor frame which carries the field 3, preferably of a constant speed, A. C., squirrel-cage motor M. The squirrel-cage rotor of this motor is shown at 5.

The rotor 5 is keyed at 2 to a hollow quill 7. At the left end, the quill 7 is supported by a bearing 9 upon a main shaft 11. The other end of the quill 7 is coupled through a flange 13 with a head 15 of a magnetic inductor drum 17, and bolts 37 hold together the head 15 and drum 17. The head 15 is carried upon a bearing 19 on said shaft 11. Thus, the rotor 5, quill 7, head 15, and inductor drum 17 rotate as a unit, being driven by the action of field 3, and are supported upon the bearings 9 and 19 around the shaft 11. These members 5, 7, 15 and 17 are the unitary mechanical driving elements of the device.

At numeral 21 is generically indicated a magnetic driven field element which has a driving slip connection with the driving drum 17 through (and only through) the magnetic coupling action of flux which crosses a flux gap 23. The driven element 21 is keyed to the driven shaft 11 as shown at 25. The shaft 11 is supported upon bearings 27 and 29 mounted in housings 1 and 24 respectively.

The driving and driven members 17 and 21 together form an electromagnetic, eddy-current slip clutch C located in the enclosing extension 24 from the housing 1. The inductor drum 17 is provided with a multiplicity of axial cooling passages 39 which centrifugally force air through uncovered central outlets 41, drawing air in around a deflector ring 43. Covering bands 42 guide the air axially, as shown by the arrows in Fig. 1. Air entering within circulating ring 43 in part passes through teeth 63, 61 and outside of a coil 53 to enter the left-hand set of the passages 39 via head 15.

The driven field member 21 is composed of two discs 45 and 47, between which is a spacer disc 49, all being held together by studs 51 and composed of magnetic material. Outside of the spacer disc 49 and between the discs 45 and 47 is located the peripherally wound field winding 53 which is energized over leads 55 from a pair of collector rings 57 fed by brushes 59. The leads 55 are shown diagrammatically and in fact do not mechanically interfere with brushes 59.

Figure 3:
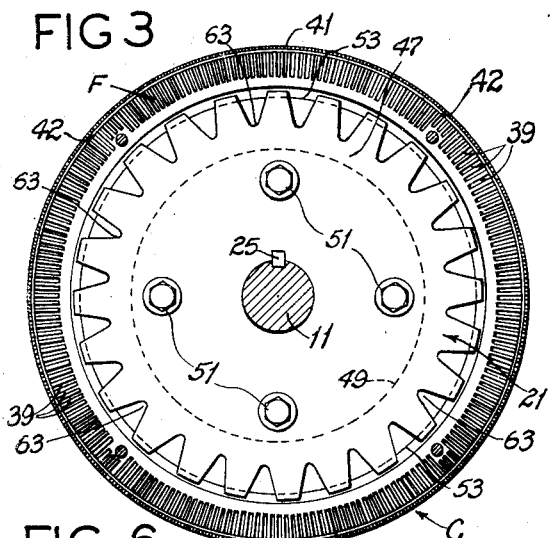
Fig. 3 is a vertical section taken on line 3—3 of Fig. 1.

The discs 45 are provided with tapered teeth at their edges, as indicated at 61 and 63 respectively (see also Fig. 3). The principle of the taper is stated in Anthony Winther United States Patents 2,106,542 and 2,197,990. The toric field at F, and passing around coil 53 (as in said patents), serves to induce eddy-currents in drum 17 and tends to form a reactive magnetic coupling between the drum 17 and driven member 21, flux being concentrated where it emanates from the teeth 61 and 63. The degree of magnetic reaction determines the coupling effect, which in turn is determined by the excitation of field 53.

Figure 4:
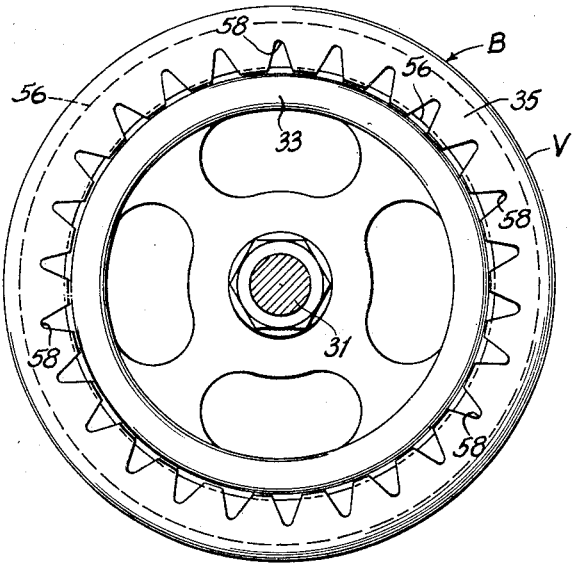
Fig. 4 is a left-end elevation of Fig. 1 viewed from line 4—4.

At the extreme left end 31 of the shaft 11, coupling is made with devices which are to be driven by the unit. If a brake is necessary, this is provided as shown at B, and is preferably constituted by an eddy-current brake drum 33, keyed to shaft 11. This rotates within a fixed field stator 35 attached to and forming part of the housing 1. This brake B also operates upon inductive principles, eddy-currents being engendered in the moving magnetic brake drum 33 by a toric flux field at V engendered by and around a stationary field winding 56 located between rows of flux-concentrating magnetic teeth 58 on the field stator 35 (see also Fig. 4). Since this brake is optional, the wiring for energizing the field 56 has not been shown, and it will suffice to state that the braking action is according to the excitation of the field 56 which may be manually or automatically controlled through a suitable rheostat or the like.

In order to provide adjustable governing means for controlling the electromagnetic connection between the driving member 17 and the driven member 21 (by controlling the excitation of field 53) there is provided the governor G which is shown generally in Fig. 1 and in detail in Fig. 2.

The governor is located in a casing 60 extending from the enclosure 24. The right-hand end of shaft 11 extends into the casing 60 where it is made hollow and keyed to a flange 62, the latter forming the central hub of a flexible diaphragm connection 64. Thus the diaphragm 64 and its hub 62 provide the driving connection between the shaft 11 and a rim 65 fastened to a drum 67. The drum 67 rotates in a bearing 69, which is supported in an extension 71 of the housing 60. The diaphragm 64 is thick enough for driving the light governor parts, and thin enough to flex endwise to take up end play between the shaft 11 and rim 65. This form of flexible disc coupling for taking up end play eliminates the necessity for a more complicated splined coupling or the like. A take-up spring 73 is used between a wall piece 75 forming an end of the hub 62 and the socket 77 in the end of the shaft 11 thus preventing noise.

Figure 5:
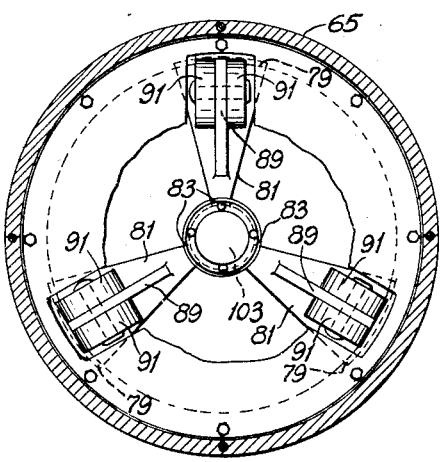
Fig. 5 is a vertical section taken on line 5—5 of Fig. 2 showing governor weights.

The rim 65 is provided with an interior groove 79 which forms an outer fulcrum or seat for a plurality (three) of governor arms 81, the inner ends 83 of which are fulcrumed in a groove 85 of a hub 87. Figs. 2 and 5 best show this feature. The fulcrumed arms 81 are free (not pinched) in their grooves and each carries a support 89 for governor weights 91. Centrifugal action upon the weights 91, with increased speed, tends to turn the governor arms 81 so that their inner ends are moved to the left (Fig. 2).

Resistance to the centrifugal action of the weights 91 in moving hub 87 is provided by a thin spring steel or brass disc 95. This disc is fulcrumed in groove 93 in the ring 65. This disc is radially free at its edge being shown flat in the drawing. Through a hole in the center of this disc 95 passes an extension of the hub 87 which is held in place by means of a nut 97 and a suitable holding washer 99. Any centrifugal action of the weights 91 which causes the hub 87 to move to the left (Fig. 2) is resisted by the spring disc 95. The advantage of using the spring disc, instead of an ordinary spring, is that it can be and is designed to provide an exponential reaction to the exponential centrifugal action of the weights 91 at various speeds, thus to provide substantially constant increments of displacement at various speeds. It is for this purpose that it is preferable that free flexing of the disc be provided for at the edges of the disc 95. Stated otherwise, the centrifugal action of the weights 91 through the arms 81 in moving the hub 87 is proportional to the square of the angular velocity. The reaction of the disc spring 95 is substantially proportional to the square of its deflection. Thus, the increment of spring deflection for each increment of angular velocity change will be constant. For example, for a predetermined incipient speed change, substantially the same lineal spring deflection will be obtained at 200 R. P. M. adjustment of the driven member, as is attained at 1,500 R. P. M.

Thus, the lateral displacement of the hub 87 will at all times be substantially directly proportional to the speed of the shaft 11 and the regulation will be good over a wide range. The advantageous result is that the device will have a substantially constant characteristic of speed regulation throughout its speed range.

It will be understood that other springs, such as cone springs, may be designed to effect the above desirable characteristics but these are more difficult to build.

Figure 6:
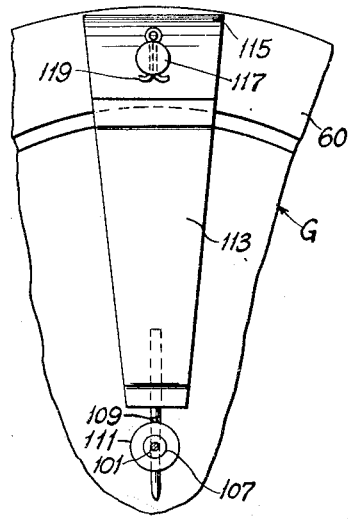
Fig. 6 is a vertical section taken on line 6—6 of Fig. 2 showing an anchoring scheme.

The purpose of the movable hub 87 is to move a control rod 101 which is connected to the hub 87 through a head 102 and a rotary end-thrust bearing 103. The rod 101 extends through a guide 105 to a point where it carries a connecting head 107 which, through a removable anchor pin 109, it attached to an insulating bushing 111. The anchor pin 109 is carried on the lower end of a spring holder 113 having a spring finger 115 with a suitable hole therethrough for attachment to a holding bolt 117 by means of a cotter key 119. The spring 113 and its fastenings may be reached through a hand hole 121 so that remote control of removal of the anchor pin 109 may be accomplished for disassembly purposes. Figs. 2 and 6 show these features most clearly.

The bushing 111 is threaded to a retractor plug 123 which has a head 125 slidable with lost motion in a pressure cup 127. The left-hand motion effects contact with a shoulder 129 on the cup 127 (Fig. 2).

The pressure cup 127 is axially movable in a recess 131 of a fixed insulating cartridge 133 held in a fixed magnetic piece or tractive magnet 159. A spring 135 which reacts against the shoulder 137 of the fixed body 133 normally presses the pressure cup 127 to the right (Fig. 2) to apply pressure to a floating carbon resistance pile 139. The other side of the carbon pile is supported by a reaction or positioning disc 141 carried upon a threaded stud 143 within an insulating bushing 147 in a hub 149. Nut 145 locks the stud 143 to the bushing 147.

The hub 149 is provided with a groove 151 which loosely surrounds the inner ends of a plurality (twelve) of articulated armature plates 153. Each plate 153 consists of a pair of riveted laminations forming a convenient mode of building up plate thicknesses. The outer edges 155 of the plates are pivotally carried in a groove 157 of the stationary magnetic member 159 forming part of the extension 60. There are used four springs 168 located in suitable sockets which push laterally to maintain a proper peripheral spacing of the armature members. This is clearly shown in Fig. 7.

The tractive magnet member 159 supports a stationary peripheral field coil 161 of toric form in the center of which is located the cartridge 133. The movable radial armature pieces 153 and the supporting member 159 for the coil 161 are magnetic so that the toric field of the coil 161 is as shown by dotted lines 163 in Fig. 2. Thus, when the coil 161 is energized, the inner ends of the sector shaped armature pieces 153 are drawn toward the coil. They fulcrum in groove 157 thus bringing their inner ends toward the left (Fig. 2) and moving the hub 149 and support 141 for the carbon pile 139.

Connections 169 serve to bring direct current to the coil 161. Connections 209 and 171 serve to send current through the carbon pile 139. The right-hand connection 171 is held to the post 143 by means of the nut 145 and the left-hand connection 209 is made through a washer 173 located between the left-hand end of the spring 135 and the shoulder 137. The spring 135 and cup 127 carry current.

To resist the motion of the hub 149 and provide a return action, the stationary member 159 peripherally supports another spring disc 164 which is held at its edges as shown at 165 and which is clamped at the center to the hub 149 as shown at 167. Spring 164 is free to enlarge radially, as is spring 95, and is shown flat in Fig. 2. As in the case of the disc 95, the disc 163 is advantageous. Its characteristics may be better made to match those of the magnetic forces which draw over the armatures 153. These forces are an exponential function of current which is better matched by the spring 164 whose reactive forces are an exponential function of displacement.

In Fig. 10 is shown the wiring diagram of the invention. Like numerals designate like parts in this diagram.

At 175 is shown a three-phase, A. C. supply circuit adapted to be connected at switch 177. This circuit feeds the motor M. One phase connection of this circuit is shown at 179 which feeds one phase in parallel to three transformers 181, 183 and 185. The primary coil 187 of the transformer 181 is connected in series with two A. C. coils 189 of a saturable choke 191. The D. C. saturating coils of the saturable choke 191 are shown at 193. The amount of current passing through coils 187 and 189 is an inverse order of the degree of flux (up to saturation) effected in the choke by the coils 193, and therefore the output current of the secondary 195 of the transformer 181 is in effect controlled by the saturable choke. The less current in coils 193, the greater the choking action of 191 and the less secondary current from transformer 181.

The secondary coil 195 of the transformer 181 is connected to serve as an input for a bridge rectifier 197 which supplies the resulting direct current over lines 199 to the exciter coil 53 of the clutch C via the brush 59, collector rings 57 and connection 55. Thus the excitation of coil 53, and the degree of synchronism in the clutch C, depends upon the direct current in the coils 193 of the saturable choke 191.

The primary coils of the transformers 183 and 185 are indicated at 201 and 202 respectively and their secondaries at 203 and 304 respectively. The secondaries feed a common line 205 through bridge rectifiers 207 and 208 respectively. The choke control circuit or line 205 feeds the direct-current coils 193 of the saturable choke 191. Direct current derived from the line 205 and coils 193 passes over the connection 209 to the carbon pile 139 via spring 131 and pressure member 127. Direct current then passes from the carbon pile 139 via line 171 back to rectifier 207 which is associated with the transformer 183.

The current for armature exciter coil 161, as stated above, is supplied over circuit 169 which is fed by the rectifier 208 of transformer 185 and closes via a small part of line 205 at rectifier 208 and via manually controllable rheostat 211. At 213 is shown a short-circuiting contact of the rheostat 211 which, when all of the resistance is cut out, connects circuit 169 with line 209 via connection 215 and a resistance 217.

Operation is as follows:

Assume that the line 175 is normally energized so as to operate the motor M at its normal synchronous (or other) speed. This energizes the connection 179 so that transformers 181, 183 and 185 are energized. The alternating current in the secondary 195 of the transformer 181 is converted into direct current for exciting the coil 53 of the clutch C (see 199, 59, 57, 55). The amount of this current, and consequently the degree of the magnetic driving through the clutch, is determined by the current in the primary coil 187 of the transformer 181. It is clear that the more the coil 53 is excited, the closer is the speed of shaft 11 to that of the rotor 5 of the motor M, and vice versa.

The alternating current from the secondary 203 of the transformer 183 is converted into direct current at rectifier 207 to be fed into the line 205 which in turn feeds through the saturating coils 193 of the saturable choke 191. This current closes its circuit through line 209, carbon pile 139, line 171 and back to the rectifier 207. When the speed incipiently drops, the centrifugal force of the weights 91 is reduced. This causes the disc-shaped, return spring 95 to force the control rod 101 to the right. This permits the spring 135 to increase the compression upon the carbon pile 139, thus to decrease its resistance, thus increase the current over circuit 207, 205, 193, 209, 139, 171. When this current increases, the saturation of the choke 191 increases, thereby reducing its reluctance, and increasing the alternating current which flows through the coils 189 and 187. This increases the current in secondary coil 195 of transformer 181 and thus the direct current in the circuit 199, 59, 57, 55 and 53. Thus, the excitation of coil 53 is increased so that the incipient decrease in speed of the driven number 21 is prevented from attaining an appreciable value. Thus further speed drop is prevented.

On the other hand, when the speed tends to increase, the reverse action takes place; centrifugal force of the revolving weights 91 increases, thus drawing the control rod 101 and cup 127 to the left and thereby compressing the spring 135 and unloading pressure from the carbon pile 139. This increases the resistance in the circuit 205, 193, 209, 139, 171 and 207 so that current is reduced in the coils 193 of the saturable choke 191. When this occurs the reluctance of the choke is increased and the current through primary 187 of transformer 181 is reduced. The resulting reduced current output from the secondary 195 results in reduced direct current through the coil 53 (via the circuit already described), with resultant increase in slip in clutch C and prevention of the growing tendency for the shaft 11 to increase its speed. Thus the speed of the shaft 11 is maintained substantially constant by the mechanical parts of the centrifugal governor G operating through the carbon pile 139 and the saturable choke to control current in coil 53.

In order manually to control the speed desired, the rheostat 211 is provided, which controls the current flowing in the circuit constituted by the rectifier 208 of the transformer 185, part of the line 205, connection 169, rheostat 211, connections 169 and the coil 161. Decrease in rheostat resistance increases speed and vice versa, as follows:

Assuming that the arm of the rheostat is moved so as to decrease its resistance (up in Fig. 10), then current in said last-traced circuit will increase, thus increasing the current in the coil 161 and thus increasing the pull on the armature pieces 153 against the reaction of the disc spring 163 (see also Fig. 2). This increased pull will move the reaction plate 141 to the left, thus increasing the pressure in the carbon pile 139, the spring 135 increasing its reaction under increased compression. The collar 129 of the cup 127 will move away (to the left) from the head 125 of the control pin 123, so that the manual control means under discussion is free of action from the automatic control rod 101. The resulting increase in current through the circuit 205, 193, 209, 139, 171 and 207 will cause increase in current in the coil 53 (via choke 191 and transformer 181, as above shown), which will cause the driven member 21 to increase in speed, thus increasing the centrifugal force of the weights 91 so that the control rod 101 is drawn to the left. The head 125 therefor follows the shoulder 129 to the new position of the latter. Any following action further than that determined by the new position assumed by the shoulder 129 in response to the manual setting of the rheostat 211, will be limited by the fact that pressure will be taken off the carbon pile 139 by the pulling action of head 125 on shoulder 129, so that further speed drop than provided for by the adjustment is prevented, as above described.

Conversely, when the rheostat 211 is set for more resistance (moved down in Fig. 10), the current in the coil 161 is reduced, thus permitting the disc spring 164 to draw the reaction plate 141 away from the carbon pile 139. This increases the resistance in the circuit 207, 205, 193, 209, 139, 171. With this reduction the saturable choke 191 is effective to reduce the current through the transformer 181 and in the coil 53 as above described, thus causing a speed drop and a consequent reduction in centrifugal force of the weights 91. The movement of the control rod 101 to the right under collapsing action of the weights is limited by the compressive action on the carbon pile 139 in increasing current as already made clear.

Thus it will be seen that the centrifugal governor always controls with reference to a speed condition consistent with the manual adjustment of the circuit for energizing the coil 161. After having attained the consistent condition, the governor maintains, within close limits, a substantially constant speed of the driven shaft 11.

The purpose of the contact 213 on the arm of rheostat 211 is to close points 214 a connection 215 having therein a resistance 217 which short-circuits the carbon pile 139 in the circuit of the rectifier 207. But this is not a dead short circuit, being through the fixed resistance 217. This has the effect of sending additional current through the saturable choke 191. The result is maximum saturation of the choke 191 with maximum transformer effect through the transformer 181. This results in maximum current in the circuit feeding the inductor coil 53. The result is that a maximum speed condition is attained which is as near synchronism between the driving motor M and the driven shaft 11 as is possible to obtain. The value of the resistance 217 is made less than that of the carbon pile 139 when the latter is fully compressed, in order to gain the desired maximum synchronism.

It will be appreciated that the action of the coil spring 135 aids that of the disc spring 95 and that its characteristics have some effect upon the balancing of the centrifugal effects of the weights 91. Inasmuch as the spring 135 follows Hooke's law, it has some effect upon the matching between the characteristics of the spring 95 and the centrifugal effects of the weights 91. However, the action of the spring 135 relatively to the spring 95 is not such as to prevent the substantial advantages above noted in connection with the characteristics of said disc spring 95.

The above construction is satisfactory for smaller units. For units of greater power, there is introduced a condition, in many instances, of hunting caused by the greater inertia of the heavier rotor part. This hunting may introduce mechanical vibration, and also undesirable electrical reactions in the line 175. In order to overcome these conditions either of the circuits of Fig. 11 or 12 may be employed. In these circuits like numerals designate like parts.

In the first alternative (Fig. 11), the primary coil 219 of a current transformer 221 is placed in series in one wire of the line 175. The secondary 223 of this transformer is connected by means of the line 225 in series with the secondary coil 203 of the transformer 183 and one side of the rectifier 207. The arrangement is such that the voltage of coils 223 and 203 oppose one another.

Any abnormally heavy current drawn in the line 175 (due for example to hunting of the rotor 5) causes a corrective effect through the circuit 225. A heavy current in the transformer 221 will cause a greater voltage which bucks the voltage of the secondary 203 of transformer 183. This has the effect of decreasing the voltage in the carbon pile circuit 205, 193, 209, 139, 171, 207 and thus through the saturable choke 191 decreasing the current delivered through transformer 181 to the clutch coil 53. This reduces the electromagnetic coupling and corrects the overrunning condition which caused the hunting. An abnormally light current in circuit 175 has the reverse effect.

A trimmer rheostat 233 which is manually operable is used to adapt this circuit to various hunting conditions which are met with.

In the alternative construction shown in Fig.

12, the corrective effect is obtained by employing an additional secondary coil 227 in the transformer 181, which through line 229 is connected in series with the secondary 204 of the transformer 185. The voltage generated by the coil 227 opposes the voltage of the secondary 204. Whenever there is a periodic change in current in transformer 181 and in the clutch coil 53, due to hunting, there will be a rise and fall in the voltage of the coil 204, this being through the additional coil 227 and circuit 229 just described. This causes a change in current in coil 161 via circuit 205, 169, 211, and rectifier 208. The result is a corrective adjusting effect on the carbon pile 139. This takes the place of the hand control, already described, in effecting automatic speed correction.

Manually operable trimmer rheostat 231 is used for adopting the circuit of Fig. 12 to various conditions of hunting which are met with.

Reference is here made, under the requirement of Rule 43 of the Patent Office, to the co-pending application of one of the inventors herein, namely, of Anthony Winther, identified as application Serial No. 391,933, filed May 5, 1941, for Electrical control apparatus.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. Control apparatus comprising a driving member, a driven member, an electromagnetic connection between said members, a field coil for exciting said connection, an A. C. supply circuit, a D. C. circuit for said field coil, rectifier means including a transformer connecting said D. C. and A. C. circuits, a saturable choke in the A. C. circuit, a D. C. supply for said saturable choke, a resistance in said D. C. choke supply circuit, centrifugal means responsive to incipient speed change of the driven member adapted to vary the resistance to vary the current in said last-named D. C. circuit, whereby the A. C. supply is varied for the D. C. field coil supply circuit.

2. Control apparatus comprising a driving member, a driven member, an electromagnetic connection between said members, a field coil for exciting said connection, an A. C. supply circuit, a D. C. circuit for said field coil, rectifier means including a transformer connecting said D. C. and A. C. circuits, a saturable choke in the A. C. circuit, a D. C. supply for said saturable choke, a resistance in said D. C. choke supply circuit, centrifugal means responsive to incipient speed change of the driven member adapted to vary the resistance to vary the current in said last-named D. C. circuit, whereby the A. C. supply is varied for the D. C. field coil supply circuit, an armature also controlling said resistance, a second exciter coil for moving said armature, a D. C. circuit for said second exciting coil, and a variable resistance in said D. C. circuit for the second exciter coil.

3. Control apparatus comprising a driving member, a driven member, an electromagnetic connection between said members, a field coil for exciting said connection, an A. C. supply, a D. C. circuit for said field coil, rectifier means including a transformer connecting said D. C. and A. C. circuits, a saturable choke in the A. C. supply circuit, a D. C. supply for said saturable choke, a resistance pile in said D. C. circuit, centrifugal means responsive to speed of the driven member adapted in response to incipient speed change to vary the pressure on the pile to vary the current in said D. C. supply circuit, whereby the A. C. supply for the D. C. field coil circuit is varied, an armature also controlling pressure on said resistance pile, a second exciter coil for moving said armature, a direct current circuit for said second exciting coil, and a manually variable resistance in said D. C. circuit for the second exciter coil.

4. Control apparatus comprising a driving member, a driven member, an electromagnetic connection between said members, a field coil for exciting said connection, an A. C. supply, a D. C. circuit for said field coil, rectifier means including a transformer connecting said D. C. and A. C. circuits, a saturable choke in the A. C. supply circuit, a D. C. supply for said saturable choke, a resistance pile in said D. C. circuit, centrifugal means responsive to speed of the driven member adapted in response to incipient speed change to vary the pressure on the pile to vary the current in said D. C. supply circuit, whereby the A. C. supply for the D. C. field coil circuit is varied, an armature also controlling pressure on said resistance pile, a second exciter coil for moving said armature, a direct current circuit for said second exciting coil, and a manually variable resistance in said D. C. circuit for the second exciter coil, rectifier means including transformers between the A. C. supply and D. C. supply circuits which supply the circuits for the saturable choke and the second exciting coil, and rectifiers fed thereby.

5. Control apparatus comprising a driving motor, a driven member, an electromagnetic connection between said motor and driven member, a field coil for exciting said connection, an A. C. supply circuit, a D. C. circuit for said field coil, rectifier means including a transformer connecting said A. C. and D. C. circuits, a saturable choke in the A. C. circuit, a D. C. choke control circuit, a resistance in said choke control circuit, means responsive to incipient speed change of the driven member adapted to vary the resistance in said choke control circuit according to speed, whereby the A. C. supply is varied for the D. C. field coil supply circuit, rectifier means including a second transformer connecting said A. C. circuit with the D. C. choke control circuit, a connection between said A. C. supply circuit and said motor, a transformer in said connection including a secondary, said last-named secondary being connected in voltage opposition to the secondary of said second transformer, whereby any abnormally heavy current drawn in said motor connection will effect voltage opposition in the secondary of said second transformer to affect the current supply to the saturable choke and whereby the A. C. supply is additionally varied for the D. C. field coil supply circuit independently of incipient speed change in the driven member.

6. Control apparatus comprising a driving member, a driven member, an electromagnetic connection between said members, a field coil for exciting said connection, an A. C. supply, a D. C. circuit for said field coil, rectifier means including a transformer connecting said A. C. and D. C. circuits, a saturable choke in the A. C. supply circuit, an A. C. choke control circuit for said saturable choke, a variable resistance in said choke control circuit, means responsive to the speed of the driven member adapted in response to incipient speed change of the driven member to vary said resistance to vary the current in said choke control circuit, whereby the A. C. supply for the D. C. field coil circuit is varied, an armature also controlling said resistance, a second exciter coil for moving said armature, a second controlling D. C. circuit for said second exciter coil, rectifier means including transformers between the A. C. supply and D. C. control circuits which supply the choke control circuit for the saturable choke and the exciting circuit for said second exciting coil, and rectifiers fed thereby, and an auxiliary secondary coil in the transformer for the first D. C. coil exciting circuit, said auxiliary secondary being connected in voltage opposition to the secondary of the transformer connecting the A. C. circuit with the D. C. control circuit for said second exciting coil.

7. Control apparatus comprising a motor driving member, a driven member, an electromagnetic connection between said members, a field coil for exciting said connection, an A. C. supply for the motor, a D. C. circuit for said field coil, rectifier means including a transformer connecting said A. C. and D. C. circuits, a saturable choke in the A. C. supply circuit, a D. C. choke control circuit for said saturable choke, a variable resistance in said choke control circuit for controlling the same, means responsive to the speed of the driven member adapted in response to speed to vary said resistance to vary the current in said choke control circuit, whereby the A. C. circuit varies its supply to the D. C. field coil circuit in response to speed change in the driven member, and means responsive to current drawn in the A. C. supply by the motor driving member also adapted to vary the current in the choke control circuit thereby to vary the A. C. supply for said D. C. circuit for said field coil.

MARTIN P. WINTHER.
ANTHONY WINTHER.